Aug. 7, 1951     I. A. RUMMEL ET AL     2,563,278
APPARATUS AND METHOD FOR FORMING FROZEN CONFECTIONS
Filed Dec. 27, 1948     2 Sheets-Sheet 1

INVENTORS
IVAN A. RUMMEL
JAMES D. WELCH
BY
ATTORNEY

Aug. 7, 1951     I. A. RUMMEL ET AL     2,563,278
APPARATUS AND METHOD FOR FORMING FROZEN CONFECTIONS
Filed Dec. 27, 1948     2 Sheets-Sheet 2
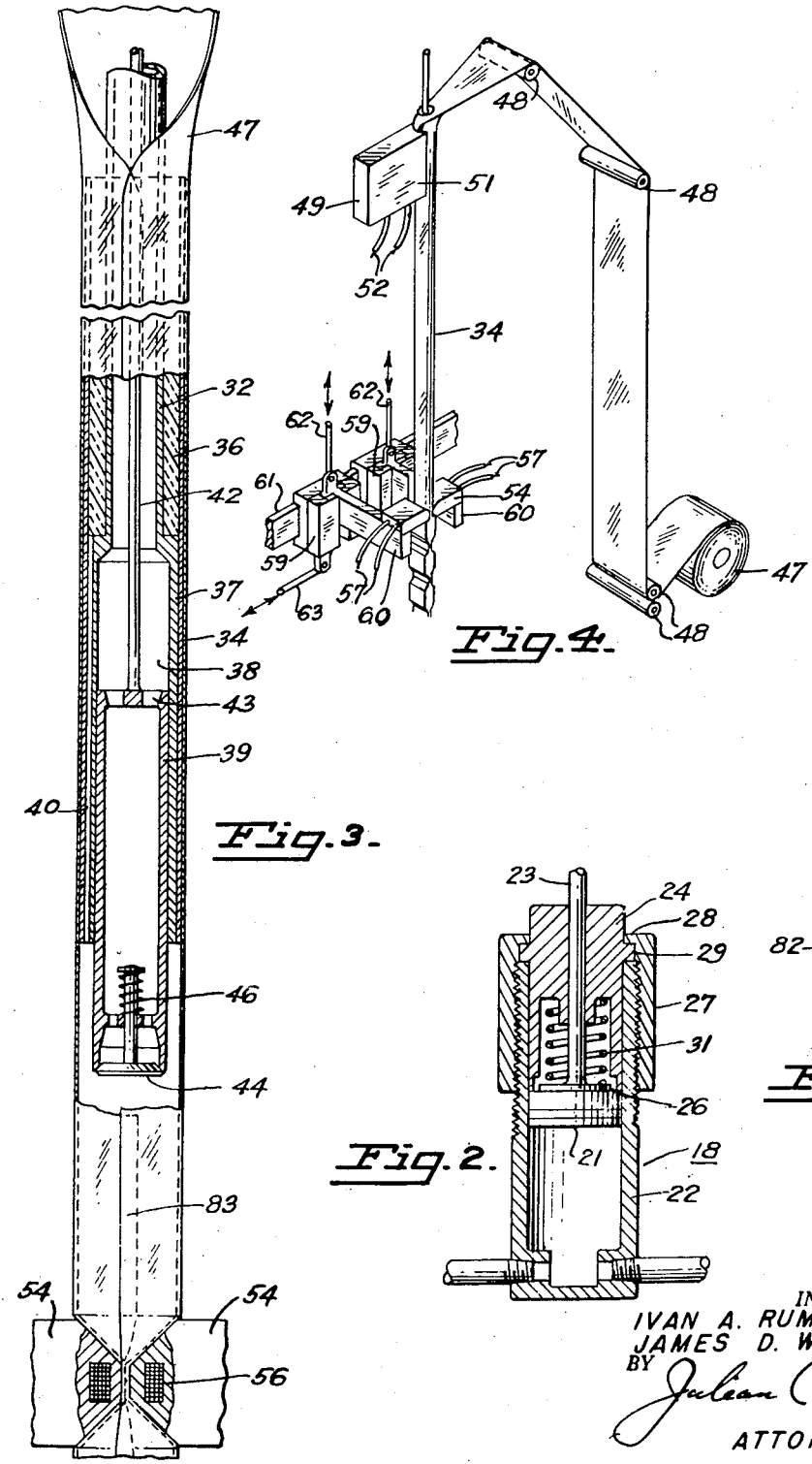
INVENTORS
IVAN A. RUMMEL
JAMES D. WELCH
BY
ATTORNEY Patented Aug. 7, 1951

2,563,278

UNITED STATES PATENT OFFICE 2,563,278

APPARATUS AND METHOD FOR FORMING FROZEN CONFECTIONS

Ivan A. Rummel and James D. Welch, Oakland, Calif., assignors to Henningsen Produce Company, Federal Inc. U. S. A., a China Trade Act corporation Application December 27, 1948, Serial No. 67,432

10 Claims. (Cl. 99—136)

The present invention relates to new and useful improvements in apparatus and method for forming frozen confection and the confection itself. The frozen confection may be compounded from any of a variety of recipes and preferably is of the common type containing a high percentage of water, together with sugar or sugar substitute and flavoring, which may be frozen into solid form. The apparatus and method are also useful in connection with confections compounded according to other recipes.

One of the principal objects of the invention is the manufacture of a frozen confection by depositing a metered quantity of mixture within a tube of cellophane, wax paper or other suitable material, preferably transparent, sealing off the top of the tube to form a bag, and then freezing the mixture after it has been sealed within the bag.

Another principal object of the invention is the provision of means for withdrawing metered quantities of mixture in semi-plastic state from a receptacle, dispensing same from a reciprocating sleeve into a tube of cellophane or similar material formed in situ, and thereby filling each bag from the bottom upward toward the top thereof, meanwhile sealing the longitudinal seam of the tube formed from a continuous strip of material and sealing the top and bottom seams of the tube to form a bag container and freezing the mixture in the bag.

Still another object of the invention is the provision of a frozen confection of truncated cylindrical shape enclosed in a bag, having an overlapped side seam and a top and bottom seam at the extremities of the truncated portions.

With the above and other objects and advantages in view, the invention consists in the matters hereinafter set forth and more particularly pointed out in the appended claims, reference being had to the accompanying drawings, in which:

Fig. 2 is a vertical section of the metering valve of such apparatus;

Fig. 3 is a vertical section of the bag filling unit;

Fig. 4 is a schematic view of the bag forming and the side, top and bottom sealing elements; and Fig. 5 is a perspective view of the confection, partly in section.

Figure 1:
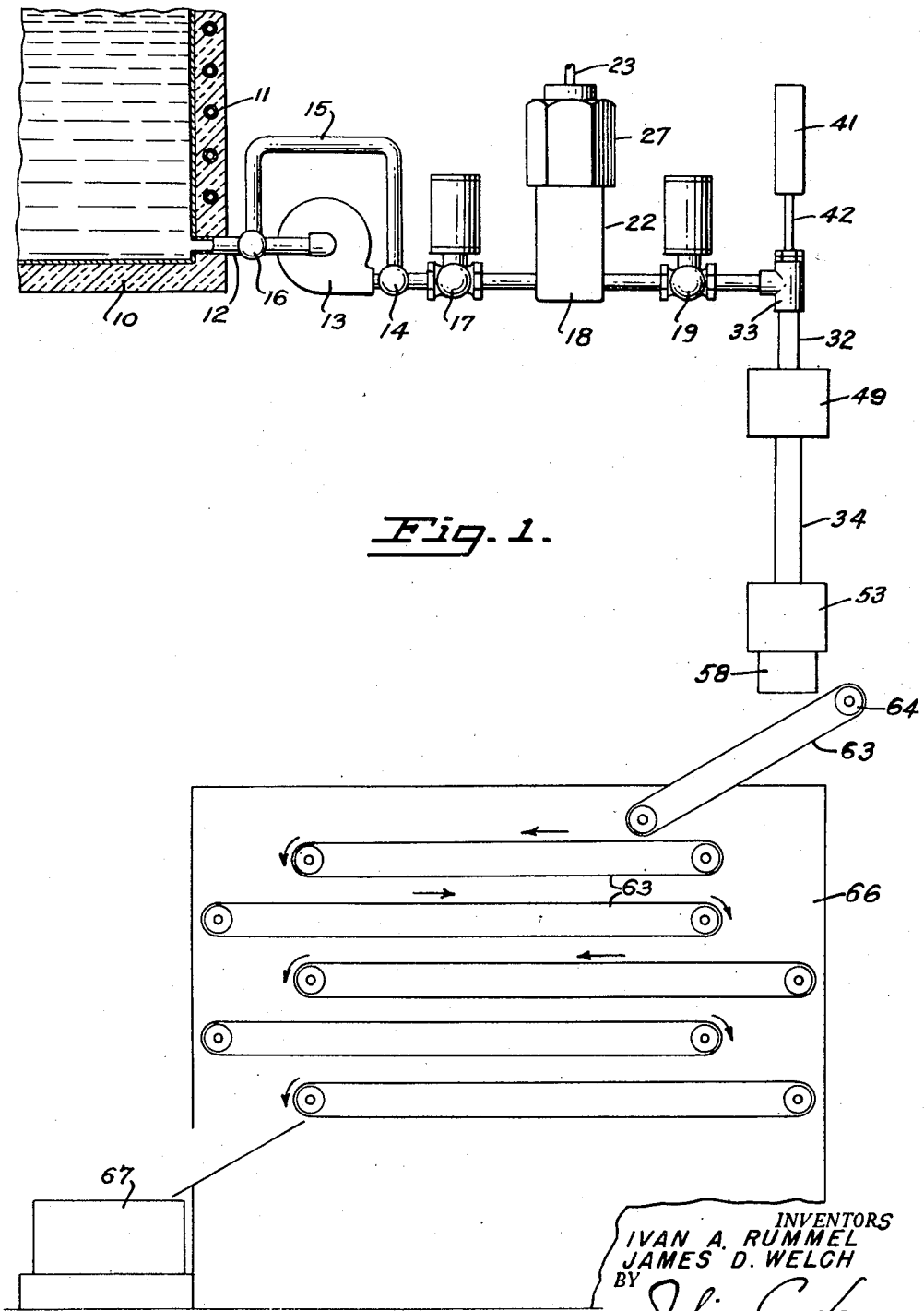
Fig. 1 is a schematic view of the apparatus for manufacturing the frozen confection.

In the preferred embodiment of the invention illustrated schematically in the accompanying drawings, the mixed ingredients of the frozen confection (consisting principally of water, sugar and flavoring, either with or without milk) are deposited in a suitable tank or other receptacle 10 where the mixture is maintained at a temperature slightly above its freezing point, i. e. at about 34° F., so that it is of a consistency which may be termed semi-plastic. In order to preserve the desired temperature, coils 11 are disposed about the receptacle 10 and a refrigerating medium of any common variety may be circulated therethrough. A pipe 12 conveys the mixture from the tank by operation of a continuously revolving centrifugal pump 13. At the discharge side of the pump is a relief valve 14 so arranged that when through passage of mixture is interrupted, by reason of the intermittent operation of the mechanism subsequently described, the mixture will flow through the by-pass pipe 15 and circulate back to the intake side of the pump through T 16 and continue such recirculation until through passage is resumed.

The discharge of the pump 13 then passes through solenoid- or pneumatically-actuated, quick-opening valve 17 and thence to metering valve 18, the construction of which is described later herein. A second quick-opening valve 19, similarly actuated, is interposed on the opposite side of metering valve 18, and the actuating mechanisms of the valves 17 and 19 are so interrelated that when one is open the other is closed, and vice versa.

The metering valve 18, shown in section in Fig. 2, consists of a reciprocating piston 21 within cylinder 22, the piston rod 23 being raised by operation of an actuator (not shown) similar to that of valve 17 when the valve 17 is open and valve 19 is closed and being lowered when valve 17 is closed and valve 19 is open. Positioned within cylinder 22 is a sleeve 24, the lower edge of which constitutes an abutment 26 limiting the upward movement of piston 21. The upper end of cylinder 22 is threaded and engages the adjusting nut 27 which is necked-in at 28 to engage collar 29 on sleeve 24. Thus by tightening or loosening nut 27, the position of abutment 26 which limits movement of piston 21 may be adjusted so as to adjust accurately the volume of the stroke of piston 21. By this means, as will apper, a metered quantity of mixture is delivered in each cycle of the operation of the mechanism. A spring 31 urges the piston to return to downward position. Thus upon filling the chamber of the cylinder 22 by raising of piston 21, valve 17 closes, valve 19 opens and the spring 31 moves the piston downwardly to discharge a metered quantity of mixture from valve 18.

After passing through valve 19, the mixture is directed into pipe 32 through T 33. The lower portion of pipe 32 is enclosed within a concentric, thin-walled bag forming tube 34, the purpose of said tube, as will hereinafter appear, being to receive and provide a guide for a strip of cellophane or other suitable material to be formed into a tubular casing for the frozen confection. The tube 34 is of greater diameter than pipe 32, and the annular space therebetween is filled with heat insulating material 36 so as to retard heat transfer from the bag sealing device to the mixture. The lower portion 37 of the pipe 32 is expanded so as to fit within tube 34, there being an air duct 40 extending along the side of portion 37 to permit escape of air during filling of the bag, and there being an enlarged, smooth walled chamber 38 within which reciprocates a cylindrical sleeve 39. Said sleeve is caused to reciprocate by action of a solenoid or pneumatically operated motor 41 to which it is connected by rod 42 passing through and being held in vertical alignment by T 33 and connected at its lower end to spider 43 on the upper end of sleeve 39. Actuation of motor 41 causes the sleeve 39 to reciprocate within chamber 38, the length of stroke of the sleeve being approximately equal to the length of the completed confection. The lower end of sleeve 39 carries a poppet valve 44 normally biased toward closed position by helical spring 46. The purpose of valve 44 is to close off the lower end of sleeve 39 and prevent drippage from the sleeve at the completion of the discharge phase of the cycle.

The description of the operation of the sleeve valve will be deferred until the construction and operation of the bag sealing mechanism has been described.

One of the features of the present invention is the formation of the bag of cellophane, wax paper or similar material, by sealing off a tube formed from a strip of material around the bag forming tube 34. Thus the completed confection is encased with a sanitary covering which also functions to form the confection in desired shape while being frozen. For such purpose there is provided a roll 47 of material from which is unwound a strip of a width such that it will form a tube of desired circumference having a longitudinal seam with an overlap sufficient to permit sealing. The strip of material is guided by rollers 48 to approach the side sealing station 49 from above. At the side seaming station 49 an iron 51, heated by electrical resistance to current passing through lead wires 52 or otherwise, bears against the overlapped material and presses the seam against the tube 34, the character of the material and the heat and pressure provided by iron 51 being such as to bond or seal the overlapped layers of the seam together. The iron 51 may be given a slight mechanical inward and outward movement so as to permit the cellophane to be drawn past the side sealing station when the iron is in retracted position and also to prevent overheating the cellophane, a situation which might occur if the iron were in contact with the cellophane for a protracted period. Alternatively, the iron 51 may be in the form of a circular roller which bears against tube 34 continuously or intermittently. It will be understood that the construction of the side sealing portion of the device is conventional and the details thereof are not part of the present invention, it being further understood that a suitable cementitious material might be used to bond the seam.

At the lower end of tube 34 is the end sealing station 53 at which the top and bottom seals of the bags of material are formed. At this station a pair of irons 54 heated by resistance elements 56 interiorally thereof to which are attached electric lead wires 57 are brought to bear from opposite directions to grip the cellophane tube which has been formed as above described and also to draw the same downwardly over the tube 34 so as to set up another section of casing for filling during the next phase of the cycle. The gripping and heating action of the irons 54 seals off the top of one bag and the bottom of the next bag in one operation, and the adjacent bags may be separated from each other by a shears of any desired type located at the next station 58. The irons 54 are actuated so as to move toward each other to grip the cellophane casing, then to move downwardly a fixed distance to pull the cellophane casing downwardly, then to separate and move upwardly to return to starting position ready for repetition of the cycle. Accordingly, the irons 54 may be mounted on T-bars 60 which are slidably mounted in ways 59 for vertical movement. Each of the ways 59 may be mounted for horizontal sliding movement on a fixed guide 61. The T-bars 60 and hence irons 54 are moved vertically within ways 59 by a suitable actuator (not shown) connected to linkage 62 attached to each of ways 59. The ways 59 and hence T-bars 60 and irons 54 are moved horizontally toward and away from each other by another actuator (not shown) attached to linkage 63 connected to ways 59. It is apparent that other mechanism may be employed to accomplish the same or equivalent sealing operation.

The operation of the filling and sealing units is positive and simple. At the commencement of the cycle, the bottom of the bag in which the mixture is to be deposited has been sealed off at the same time that the top of the preceding bag has been sealed, the bottom of the bag being stationed below the ends of coterminous tube 34 and pipe 37. The lower extremity of sleeve 39 is about at the bottom of the bag; thus the mixture discharged through the sleeve 39 is deposited near the bottom of the bag and the bag is filled as the sleeve is drawn upward, insuring complete filling of the bag without entrapment of air. As the sleeve reaches the bottom of the bag, the valve 19 opens and a metered quantity of mixture is discharged by expansion of spring 31 in metering valve 18, the discharged portion pushing a corresponding amount of mixture already beyond valve 18 downwardly through pipe 32, into sleeve 39, past valve 44 and into the bag. Entrapped air escapes through duct 40 leading up pipe 37 to the atmosphere. Meanwhile the sleeve 39 is drawn gradually upward by operation of actuator 41, filling the bag as it moves. When sleeve 39 reaches the top of its stroke, a metered quantity of mixture has been deposited in the bag, the valve 19 is closed and the relaxation of pressure automatically permits spring 46 to close valve 44, thus stopping drippage from the end of the sleeve which would otherwise prevent a proper end seal. The irons 54 are moved apart in a horizontal direction, then upwardly and together again, thereby gripping the cellophane tube at a point adjacent the ends of tube 34 and pipe 37. The irons grip the cellophane and seal the tube and are also given a downward movement to pull the cellophane down over the outside of tube 34 and move the tube into position for the next filling operation. The sealing operation simultaneously seals the top of one bag and the bottom of the next. During the sealing operation, the sleeve 39 is moved downwardly as the irons 54 move, so that at the end of the cycle it is at the bottom of its stroke. During the sealing operation the valve 17 has opened and the metering valve 18 has been filled with mixture to provide the pulsation for discharge of mixture during the next cycle.

After the bags have been severed at the shear station 58, they drop on to continuously moving belts 63 driven by rollers 64 and, passing along a series of such belts in a circuitous path, they are quick frozen within the freezing chamber 66. Other conveying mechanism within the freezing chamber may, of course, be employed. After being frozen, the confections may be deposited in a suitable receptacle 67 for storage and transportation. The actuators for the valves 17, 18 and 19, for the linkages 62 and 63 and the motor 41 are timed to operate in proper sequence in any suitable and well known manner, as, for example, by relay switches.

The preferred shape of the frozen confection 81 is illustrated in Fig. 5. It may be elliptical in cross-section, such shape being derived from proper shaping of tube 34. It is, of course, apparent that the cross section might be rectangular, round or other desired form, the shape depending primarily upon the shape of tube 34. The cellophane bag or other suitable covering 82 preserves the confection in a sanitary condition, but one of the features of the invention is that the covering also serves the function of holding the confection in proper shape during freezing. The bag 82 is formed with an overlapped side seam 83 and bottom and top seams 84 and 86, respectively. The shape of the irons 54 which move together to form the seams determine the shape of the top and bottom of the confection and it is apparent that they may be varied within reasonable limits as desired.

It is understood that whereas a preferred embodiment of the invention has been described and illustrated, changes may be made therein without departing from the spirit of the invention and the scope of the appended claims.

What is claimed is:

1. Apparatus for forming a frozen confection comprising, a pump arranged to convey mixture from a receptacle, a valve for metering a quantity of mixture, a second valve between said first valve and said pump, a third valve between said first valve and the succeeding mechanism, said second and third valves being arranged to open alternately, a bag forming tube, means for forming a tubular casing about said tube, means for depositing a metered quantity of mixture within said casing, means for sealing off said casing to form an enclosing bag, and means for freezing said confection in said bag.

2. In apparatus for forming and filling individual closed receptacles, wherein a charge of mixture is delivered within a bag-forming tube, the combination with said tube of a pipe within said tube, and a sleeve reciprocable within said pipe and receiving said charge of mixture from said pipe.

3. In apparatus for forming and filling individual closed receptacles wherein a charge of mixture is delivered within a bag-forming tube, the combination with said tube of a reciprocable sleeve positioned within said tube for depositing said charge of mixture, and a spring-biased valve for closing off the end of said sleeve except when a charge of mixture is being emitted under pressure.

4. In apparatus for forming and filling individual closed receptacles, wherein a mixture is delivered within a bag-forming tube, the combination with said tube of means for forming a tubular casing of flexible material about said tube, means for gripping said casing and advancing said casing the amount requisite to form a confection of the desired volume and simultaneously sealing off the casing to close off the top of one bag and the bottom of the succeeding bag.

5. In apparatus for forming and filling individual closed receptacles, wherein a mixture is delivered within a bag-forming tube, the combination with said tube of means for feeding a strip of flexible material, means for forming said strip into a cylindrical casing about said tube, means for sealing the simple overlapped edges of said casing along the longitudinal seam thereof, means for gripping said casing and advancing said casing the amount requisite to form a confection of the desired volume and simultaneously sealing off the casing to close off the top of one bag and the bottom of the succeeding bag.

6. In a system for forming individual closed receptacles and filling said closed receptacles with a mixture adapted to be frozen into a frozen confection and wherein said mixture is deposited within a bag-forming tube about which a tubular casing is formed, the combination comprising: means for metering successive, predetermined charges of mixture into said casing, means for advancing said casing, and means for sealing off said casing transversely to form successive individual closed receptacles each enclosing one of said charges of mixture.

7. In a system for forming individual closed receptacles and filling said closed receptacles with a mixture adapted to be frozen into a frozen confection and wherein said mixture is deposited within a bag-forming tube about which a tubular casing is formed, the combination comprising: means for metering successive, predetermined charges of mixture, a pipe within said bag forming tube, said pipe communicating with said last-named means, a sleeve reciprocable within said pipe and receiving successive charges of mixture from said pipe, means for advancing said casing over said tube, and means for sealing off said casing transversely to form successive individual closed receptacles each enclosing one of said charges of mixture.

8. The combination of claim 7 which further includes a spring-biased poppet valve for closing off the end of said sleeve except when a charge is being emitted under pressure.

9. A method for forming frozen confections comprising, the step of delivering metered quantities of unfrozen mixture in successive pulsating charges, the step of discharging the mixture into a tubular casing, and the step of sealing off said casing transversely into a plurality of individual, filled, closed bags each enclosing a predetermined quantity of mixture.

10. The method of forming a frozen confection which comprises the following steps: delivering metered quantities of unfrozen mixture in a plurality of successive pulsating charges, discharging said mixture into a tubular casing near the bottom thereof and elevating the point of discharge of said mixture as filling progresses, and sealing off said casing transversely into a plurality of individual closed bags each enclosing a predetermined quantity of mixture.

IVAN A. RUMMEL.
JAMES D. WELCH.

REFERENCES CITED

The following references are of record in the file of this patent:

UNITED STATES PATENTS

| Number | Name | Date |
|---|---|---|
| 2,006,375 | Vogt | July 2, 1935 |
| 2,006,376 | Vogt | July 2, 1935 |
| 2,027,545 | Mapes | Jan. 14, 1936 |